(No Model.)
W. E. SMITH.
BICYCLE.
No. 403,153. Patented May 14, 1889.
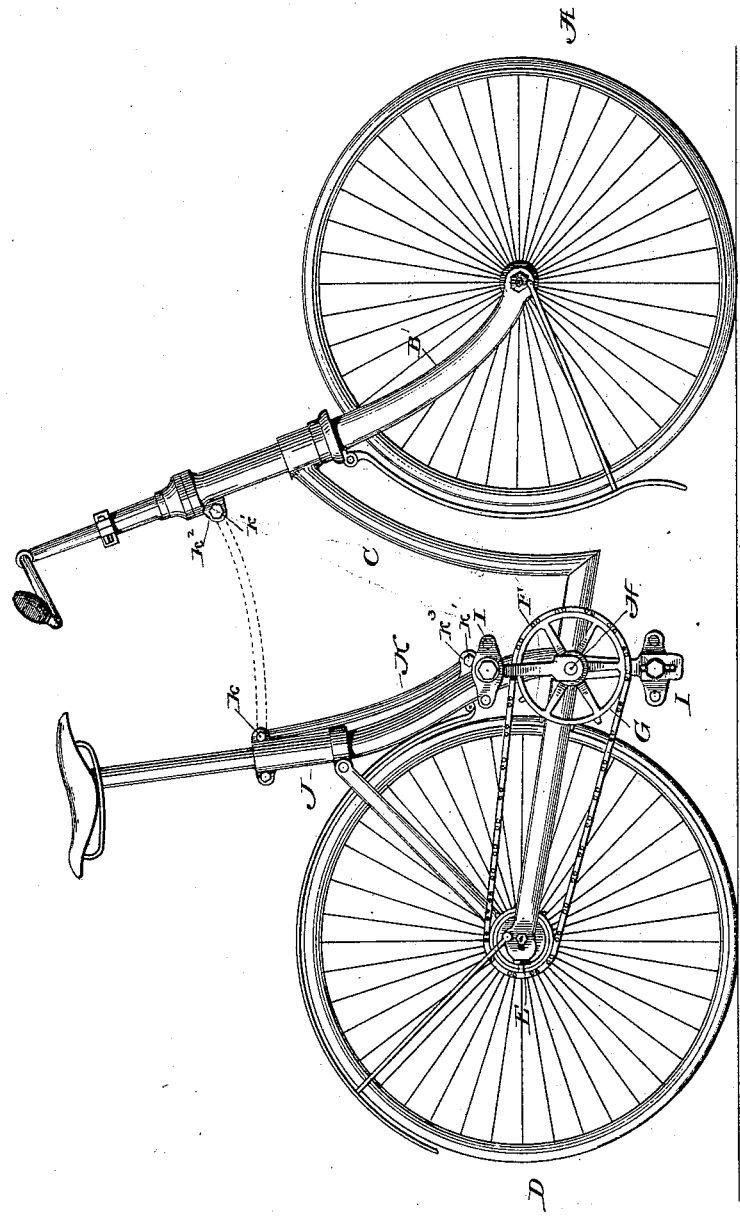
Witnesses.
Inventor,
W. E. Smith,
By Phil. T. Dodge
Attorney.

UNITED STATES PATENT OFFICE.

WILLIAM E. SMITH, OF WASHINGTON, DISTRICT OF COLUMBIA, ASSIGNOR, BY MESNE ASSIGNMENTS, TO PHILIP T. DODGE, TRUSTEE, OF SAME PLACE.

BICYCLE.

SPECIFICATION forming part of Letters Patent No. 403,153, dated May 14, 1889.

Original application filed February 16, 1888, Serial No. 254,187. Divided and this application filed October 15, 1888. Serial No. 288,127. (No model.)

*To all whom it may concern:*

Be it known that I, WILLIAM E. SMITH, a citizen of Great Britain, residing at Washington, in the District of Columbia, have invented certain new and useful Improvements in Bicycles, of which the following is a specification, the same being a division of the original application, Serial No. 254,187, filed February 16, 1888.

My invention relates to the so-called "safety-bicycles," in which a seat-supporting frame is provided with a front steering-wheel and a rear driving-wheel actuated through a chain and sprocket-wheels from a pedal-shaft between the ground-wheels.

The object of the invention is to so construct the frame that it may be given great rigidity when used by male riders or subjected to severe strains, and at the same time adapt it to be changed or converted in such manner as to leave an unobstructed space between the wheels, that it may be used by female riders without interference with their skirts.

To this end it consists, essentially, in the combination, with the two wheels arranged one directly in advance of the other, of the connecting-frame depressed or curved downward between the wheels to about the level of the rider's feet, and a movable brace extending across or above the depressed portion of the frame and connected to the latter in front and rear. This brace may be variously attached; but I recommend its connection to the frame by means of a hinge at one end and a removable bolt at the other, the parts being so shaped and arranged in relation to each other that when the brace is not required it may be turned downward against the depressed portion of the frame and out of the way of the rider.

In the accompanying drawing the figure is a side elevation of the machine containing my improvement.

Referring to the drawing, A represents the front ground-wheel having its axle mounted in and between the arms of the upright steering-fork B, which latter has its upper end journaled in an upright position, as usual, in the forward end of the main frame C, which has its rear end divided or forked to receive the rear wheel, D, by which the machine is propelled. The frame is curved or bent downward between the wheels to about the level of the rider's feet when in action.

A standard, J, forming part of the frame, is erected immediately in front of the rear wheel and suitably braced at the rear to hold it in position, and provided on its upper end with a seat or saddle for the rider.

A horizontal shaft, H, is located just forward of the rear wheel in suitable bearings in the frame, and provided at opposite ends with cranks carrying foot-pedals I. This shaft is also provided with a sprocket-wheel, G, connected by a chain, F, to a sprocket-wheel, E, on the hub of the driving-wheel D.

It will be observed that the depression of the frame is forward of the seat, and of such character as to permit the skirts of a female rider to hang without interference within the frame. In other words, the frame is depressed forward of the seat in such manner as to leave an open unobstructed space from the top downward to about the level of the feet of the rider, allowing female riders to mount and dismount at the side, and permitting their skirts to hang in a natural position between the two wheels without interference with the frame.

Owing to the length and the curved form of the main frame between the wheels there is liability of its springing or bending when subjected to very severe strains. To avoid this difficulty, I provide a brace, K, which in the present instance is hinged at $k$ to ears at the top of the seat-standard, and adapted to be turned upward to a horizontal position and connected by a removable bolt, $k'$, to ears $k^2$, at the top of the steering-head, as shown in dotted lines in the figure. It will be observed that the brace spans or extends across the depressed portion of the frame, being attached to the frame at elevated points in front and rear. When in place, it gives the frame extreme rigidity. When the brace is in position, the machine is of course adapted for the use of male riders only, inasmuch as the rider is compelled to sit astride of the brace.

When the machine is to be used by the female rider, the bolt $k'$ is removed and the brace turned downward against the frame, as shown in full lines. To prevent its vibration when thus folded, the frame may be provided with lugs $k^3$, to which the brace may be secured, as shown, by the bolt $k'$.

The essence of my invention resides in combining with the frame, which is dropped or depressed between the wheels, a brace spanning the depressed portion and connected to the frame in front and rear, when said brace is adapted to be moved into and out of its operative position at will. The form and details of the brace may be modified within the limits of mechanical skill.

Having thus described my invention, what I claim is—

1. In a bicycle, the combination of two ground-wheels arranged one directly in advance of the other, the connecting-frame provided with a seat and depressed between the wheels and forward of the seat to about the level of the rider's feet, and an elevated brace spanning the depressed portion of the frame and connected thereto in front and rear, said brace movably connected to the frame, substantially as described, whereby the frame may be stiffened for the use of male riders or adjusted to admit the skirts of female riders at will.

2. In a bicycle having a front steering and a rear driving wheel, and the main frame depressed between the wheels, as described, a brace to span the depressed portion and connect the two ends of the frame, hinged at one end to said frame and detachably connected thereto at the opposite end, whereby said brace may be disconnected at one end and turned out of its operative position without removal from the frame.

3. In combination with the frame depressed between the wheels and provided with a seat-standard, J, and the ears $k$ and $k^2$, the brace hinged to the seat-standard, detachably connected to the front end of the machine and adapted to swing downward to the ear $k^3$, whereby the brace may be thrown out of action and fastened in place without removal from the machine.

In testimony whereof I hereunto set my hand, this 15th day of October, 1888, in the presence of two attesting witnesses.

WILLIAM E. SMITH.

Witnesses:
W. R. KENNEDY,
STANLY ELMORE.